(12) United States Patent
Wiacek

(10) Patent No.: US 11,943,729 B2
(45) Date of Patent: Mar. 26, 2024

(54) NETWORK TIME MONITORING AND ADJUSTMENT

(71) Applicant: Nokia Technologies Oy, Espoo (FI)

(72) Inventor: Fabian Wiacek, Warsaw (PL)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 17/906,431

(22) PCT Filed: Mar. 22, 2021

(86) PCT No.: PCT/FI2021/050200
§ 371 (c)(1),
(2) Date: Sep. 15, 2022

(87) PCT Pub. No.: WO2021/191502
PCT Pub. Date: Sep. 30, 2021

(65) Prior Publication Data
US 2023/0112328 A1  Apr. 13, 2023

(30) Foreign Application Priority Data
Mar. 26, 2020 (FI) .................................... 20205302

(51) Int. Cl.
*H04W 56/00* (2009.01)
*H04L 5/00* (2006.01)
(52) U.S. Cl.
CPC ......... *H04W 56/004* (2013.01); *H04L 5/0051* (2013.01)
(58) Field of Classification Search
CPC .............. H04L 5/0051; H04W 56/004; H04W 56/0055
See application file for complete search history.

(56) References Cited

U.S. PATENT DOCUMENTS 9,270,442 B2  2/2016  Rice et al.
9,407,357 B1  8/2016  Roggendorf et al.
(Continued)

FOREIGN PATENT DOCUMENTS

CN  101515831  8/2009
JP  4492295 B2  6/2010
(Continued)

OTHER PUBLICATIONS

Office action received for corresponding Finnish Patent Application No. 20205302, dated Sep. 30, 2020, 8 pages.
(Continued)

*Primary Examiner* — Ian N Moore
*Assistant Examiner* — Latresa A McCallum
(74) *Attorney, Agent, or Firm* — Robert P. Michal, Esq.; Carter, DeLuca & Farrell LLP

(57) ABSTRACT

Apparatuses and methods for monitoring network timing are disclosed. A method comprises storing (300) information on a reference propagation delay between the apparatus and one or more radio access nodes, controlling (302) reception of a reference signal from one or more radio access nodes, the reference signal comprising information on the transmission time instant of the signal, determining (304) the reception time instant of the reference signal, determining (306) the propagation delay of the reference signal based on the time difference of the reception time instant and the transmission time instant, and determining (308) correctness of time references of the apparatus and the one or more radio access nodes based on the determined and stored propagation delays.

2 Claims, 13 Drawing Sheets

(56) References Cited

U.S. PATENT DOCUMENTS

| | | | |
|---|---|---|---|
| 2019/0150106 A1 | 5/2019 | Teruhi et al. | |
| 2019/0357165 A1 | 11/2019 | Koelemeij et al. | |
| 2020/0028550 A1* | 1/2020 | Manolakos | H04B 7/0478 |
| 2020/0245372 A1* | 7/2020 | Lei | H04L 27/2602 |
| 2022/0116254 A1* | 4/2022 | Wang | H04L 27/26132 |

FOREIGN PATENT DOCUMENTS

| | | |
|---|---|---|
| JP | 2015206639 A | 11/2015 |
| JP | 2017/076927 A | 4/2017 |
| WO | 2017/204702 A1 | 11/2017 |
| WO | WO 2017/200043 A1 | 11/2017 |
| WO | 2019/192322 A1 | 10/2019 |
| WO | WO-2019192322 A1 * | 10/2019 |

OTHER PUBLICATIONS

Office action received for corresponding Finnish Patent Application No. 20205302, dated Feb. 10, 2021, 5 pages.

International Search Report and Written Opinion received for corresponding Patent Cooperation Treaty Application No. PCT/FI2021/050200, dated Jun. 9, 2021, 16 pages.

Office action received for corresponding Indian Patent Application No. 202247060873, dated Dec. 30, 2022, 8 pages.

Office Action for Japanese Application No. 2022-558073 dated Aug. 17, 2023, 10 pages.

\* cited by examiner $$T_0(T_{e1}) \quad T_1(T_{ut})$$
$$\overline{\phantom{T_{ref}(eNB1)}} \quad T_1(T_{ut}) - T_0(T_{e1}) = T_{ref}(eNB1)$$
$$T_{ref}(eNB1)$$

$$T_3(T_{e2}) \quad T_4(T_{ut})$$
$$\overline{\phantom{T_{ref}(eNB2)}} \quad T_4(T_{ut}) - T_3(T_{e2}) = T_{ref}(eNB2)$$
$$T_{ref}(eNB2)$$

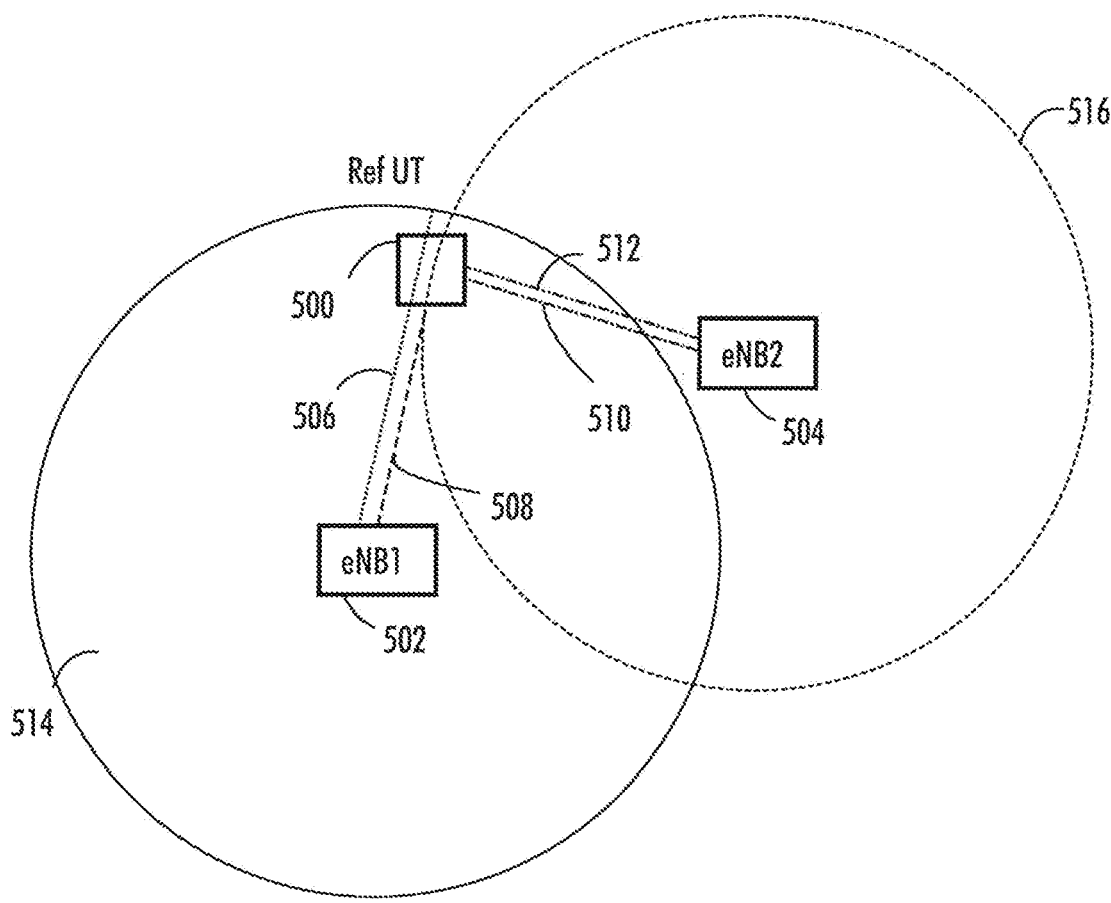

NETWORK TIME MONITORING AND ADJUSTMENT

RELATED APPLICATION

This application was originally filed as PCT Application No. PCT/FI2021/050200, filed on Mar. 22, 2021, which claims priority from Finnish Application No. 20205302, filed on Mar. 26, 2020, each of which is incorporated herein by reference in its entirety.

FIELD OF THE INVENTION

The exemplary and non-limiting embodiments of the invention relate generally to wireless communication systems. The exemplary and non limiting embodiments of the invention relate especially to apparatuses and methods in wireless communication networks.

BACKGROUND

In wireless telecommunication synchronous systems such as Global System for Mobile Communications, GSM, long term evolution advanced, LTE Advanced, LTE-A or new radio, NR, 5G may provide to user terminals information about network time over radio interface, which may be for instance Coordinated Universal Time, UTC. Network time may be used for internal clock synchronisation of the user terminals, for example. In general, time references in the user terminals have a poor stability and the internal clocks need to be periodically synchronized with Network time. This applies also to radio access nodes serving the user terminals. The internal clock of a radio access node needs to be synchronized with Precision Reference Clock, PRC, of the network. PRC may be obtained from Global Navigation Satellite System, GNSS, time or from atomic clock, for example.

If PRC synchronization is lost, a mobile network may continue operation for the given period based on internal clocks of the network elements. For example, if the network time is based on GNSS time, a malfunction or outage of satellite-based system may occur. Examples of such scenarios may be solar flares or jamming attacks. Also, in case of atomic clocks there may be system failures. If a cumulative time or frequency error caused by some malfunction grows too large, further operation of the network may be in danger. This also applies to operation over a radio interface, where a user terminal may continue operation without synchronization by the given, relatively short period of time.

SUMMARY

The following presents a simplified summary of the invention in order to provide a basic understanding of some aspects of the invention. This summary is not an extensive overview of the invention. It is not intended to identify key elements of the invention or to delineate the scope of the invention. Its sole purpose is to present some concepts of the invention in a simplified form as a prelude to a more detailed description that is presented later.

According to an aspect of the present invention, there is provided an apparatus in a communication network, comprising: means for storing information on a reference propagation delay between the apparatus and one or more radio access nodes; means for controlling reception of a reference signal from one or more radio access nodes, the reference signal comprising information on the transmission time instant of the signal; means for determining the reception time instant of the reference signal; means for determining the propagation delay of the reference signal based on the time difference of the reception time instant and the transmission time instant; and means for determining correctness of time references of the apparatus and the one or more radio access nodes based on the determined and stored propagation delays.

According to an aspect of the present invention, there is provided an apparatus in a communication network, comprising: means for controlling transmission of a reference signal to a user terminal, the reference signal comprising information on the transmission time instant of the signal; means for controlling reception of an indication from the user equipment, the indication comprising information on the correction for the time reference of the apparatus; means for correcting the time reference of the apparatus based on the indication.

According to an aspect of the present invention, there is provided a method, comprising: storing information on a reference propagation delay between an apparatus and one or more radio access nodes; controlling reception of a reference signal from one or more radio access nodes, the reference signal comprising information on the transmission time instant of the signal; determining the reception time instant of the reference signal; determining the propagation delay of the reference signal based on the time difference of the reception time instant and the transmission time instant; and determining correctness of time references of the apparatus and the one or more radio access nodes based on the determined and stored propagation delays.

According to an aspect of the present invention, there is provided a method in a communication network, comprising: controlling transmission of a reference signal to a user terminal, the reference signal comprising information on the transmission time instant of the signal; controlling reception of an indication from the user equipment, the indication comprising information on the correction for the time reference of the apparatus; and correcting the time reference of the apparatus based on the indication.

According to an aspect of the present invention, there is provided a computer program comprising instructions for causing an apparatus to perform at least the following: storing information on a reference propagation delay between the apparatus and one or more radio access nodes; controlling reception of a reference signal from one or more radio access nodes, the reference signal comprising information on the transmission time instant of the signal; determining the reception time instant of the reference signal; determining the propagation delay of the reference signal based on the time difference of the reception time instant and the transmission time instant; and determining correctness of time references of the apparatus and the one or more radio access nodes based on the determined and stored propagation delays.

According to an aspect of the present invention, there is provided a computer program comprising instructions for causing an apparatus to perform at least the following: controlling transmission of a reference signal to a user terminal, the reference signal comprising information on the transmission time instant of the signal; controlling reception of an indication from the user equipment, the indication comprising information on the correction for the time reference of the apparatus; and correcting the time reference of the apparatus based on the indication.

One or more examples of implementations are set forth in more detail in the accompanying drawings and the description below. Other features will be apparent from the description and drawings, and from the claims. The embodiments and or examples and features, if any, described in this specification that do not fall under the scope of the independent claims are to be interpreted as examples useful for understanding various embodiments of the invention.

BRIEF DESCRIPTION OF THE DRAWINGS

In the following the invention will be described in greater detail by means of preferred embodiments with reference to the attached drawings, in which

FIGS. 5A, 5B, 6A, 6B, 7A and 7B illustrate examples of some embodiments;

DETAILED DESCRIPTION

The following embodiments are only examples. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may also contain features, structures, units, modules etc. that have not been specifically mentioned.

Some embodiments of the present invention are applicable to user equipment, user terminal, a base station, eNodeB, gNodeB, a distributed realisation of a base station, a network element of a communication system, a corresponding component, and/or to any communication system or any combination of different communication systems that support required functionality.

The protocols used, the specifications of communication systems, servers and user equipment, especially in wireless communication, develop rapidly. Such development may require extra changes to an embodiment. Therefore, all words and expressions should be interpreted broadly, and they are intended to illustrate, not to restrict, embodiments.

In the following, different exemplifying embodiments will be described using, as an example of an access architecture to which the embodiments may be applied, a radio access architecture based on long term evolution advanced (LTE Advanced, LTE-A) or new radio (NR, 5G), without restricting the embodiments to such an architecture, however. The embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

Figure 1:
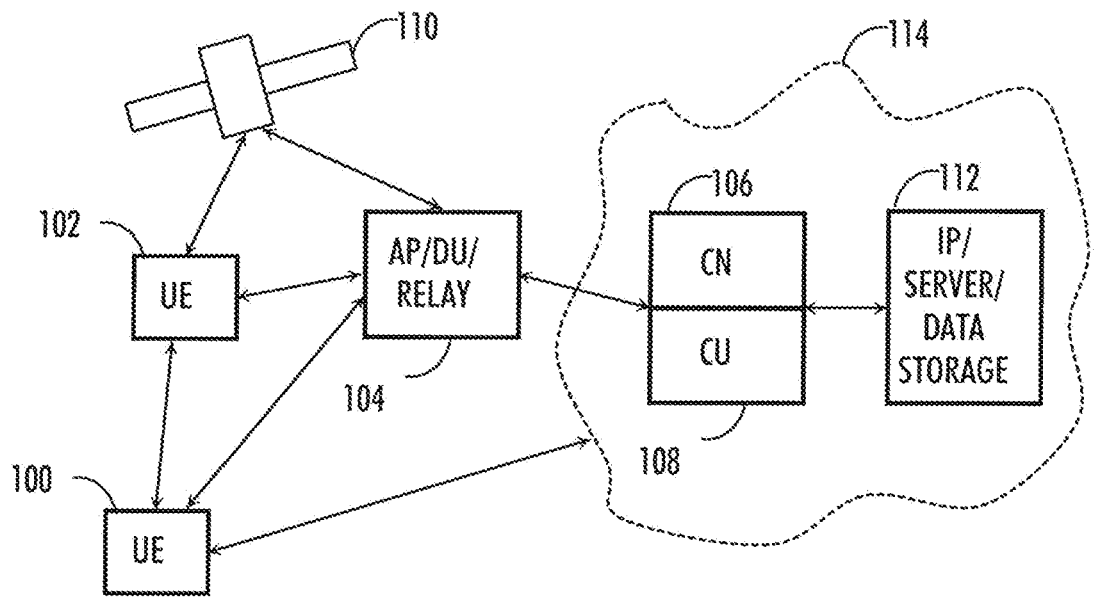
FIGS. 1 and 2 illustrate examples of simplified system architecture of a communication system.

FIG. 1 depicts examples of simplified system architectures showing some elements and functional entities, all or some being logical units, whose implementation may differ from what is shown. The connections shown in FIG. 1 are logical connections; the actual physical connections may be different. It is apparent to a person skilled in the art that the system typically comprises also other functions and structures than those shown in FIG. 1.

The embodiments are not, however, restricted to the system given as an example but a person skilled in the art may apply the solution to other communication systems provided with necessary properties.

The example of FIG. 1 shows a part of an exemplifying radio access network.

FIG. 1 shows devices 100 and 102. The devices 100 and 102 may, for example, be user devices or user terminals. The devices 100 and 102 are configured to be in a wireless connection on one or more communication channels with a node 104. The node 104 is further connected to a core network 106. In one example, the node 104 may be an access node such as (e/g)NodeB providing or serving devices in a cell. In one example, the node 104 may be a non-3GPP access node. The physical link from a device to a (e/g)NodeB is called uplink or reverse link and the physical link from the (e/g)NodeB to the device is called downlink or forward link. It should be appreciated that (e/g)NodeBs or their functionalities may be implemented by using any node, host, server or access point etc. entity suitable for such a usage.

A communications system typically comprises more than one (e/g)NodeB in which case the (e/g)NodeBs may also be configured to communicate with one another over links, wired or wireless, designed for the purpose. These links may be used for signalling purposes. The (e/g)NodeB is a computing device configured to control the radio resources of communication system it is coupled to. The NodeB may also be referred to as a base station, an access point or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to devices. The antenna unit may comprise a plurality of antennas or antenna elements. The (e/g)NodeB is further connected to the core network 106 (CN or next generation core NGC). Depending on the system, the counterpart on the CN side can be a serving gateway (S-GW, routing and forwarding user data packets), packet data network gateway (P-GW), for providing connectivity of devices (UEs) to external packet data networks, or mobile management entity (MME), etc.

The device (also called user device, a subscriber unit, user equipment (UE), user terminal, terminal device, etc.) illustrates one type of an apparatus to which resources on the air interface are allocated and assigned, and thus any feature described herein with a device may be implemented with a corresponding apparatus, such as a relay node. An example of such a relay node is a layer 3 relay (self-backhauling relay) towards the base station.

The device typically refers to a device (e.g. a portable or non-portable computing device) that includes wireless mobile communication devices operating with or without a universal subscriber identification module (USIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a device may also be a nearly exclusive uplink device, of which an example is a camera or video camera loading images or video clips to a network. A device may also be a device having capability to operate in Internet of Things (IoT) network which is a scenario in which objects are provided with the ability to transfer data over a network without requiring human-to-human or human-to-computer interaction, e.g. to be used in smart power grids and connected vehicles. The device may also utilise cloud. In some applications, a device may comprise a user portable device with radio parts (such as a watch, earphones or eyeglasses) and the computation is carried out in the cloud. The device (or in some embodiments a layer 3 relay node) is configured to perform one or more of user equipment functionalities.

Various techniques described herein may also be applied to a cyber-physical system (CPS) (a system of collaborating computational elements controlling physical entities). CPS may enable the implementation and exploitation of massive amounts of interconnected information and communications technology, ICT, devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications (such as (massive) machine-type communications (mMTC), including vehicular safety, different sensors and real-time control. 5G is expected to have multiple radio interfaces, namely below 6 GHz, cmWave and mmWave, and also being integrable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, below 6 GHz-cmWave-mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and fully centralized in the core network. The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 112, or utilize services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

The technology of Edge cloud may be brought into a radio access network (RAN) by utilizing network function virtualization (NVF) and software defined networking (SDN). Using the technology of edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU 104) and non-real time functions being carried out in a centralized manner (in a centralized unit, CU 108).

It should also be understood that the distribution of labour between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or nodeB (gNB). It should be appreciated that MEC can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway/maritime/aeronautical communications. Satellite communication may utilise geostationary earth orbit (GEO) satellite systems, but also low earth orbit (LEO) satellite systems, in particular megaconstellations (systems in which hundreds of (nano)satellites are deployed). At least one satellite 110 in the mega-constellation may cover several satellite-enabled network entities that create on-ground cells. The on-ground cells may be created through an on-ground relay node 104 or by a gNB located on-ground or in a satellite.

It is obvious for a person skilled in the art that the depicted system is only an example of a part of a radio access system and in practice, the system may comprise a plurality of (e/g)NodeBs, the device may have an access to a plurality of radio cells and the system may comprise also other apparatuses, such as physical layer relay nodes or other network elements, etc. At least one of the (e/g)NodeBs may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 1 may provide any kind of these cells. A cellular radio system may be implemented as a multilayer network including several kinds of cells. Typically, in multilayer networks, one access node provides one kind of a cell or cells, and thus a plurality of (e/g) NodeBs may be needed to provide such a network structure.

For fulfilling the need for improving the deployment and performance of communication systems, the concept of "plug-and-play" (e/g)NodeBs has been introduced. Typically, a network which is able to use "plug-and-play" (e/g)Node Bs, includes, in addition to Home (e/g)NodeBs (H(e/g)nodeBs), a home node B gateway, or HNB-GW (not shown in FIG. 1). An HNB Gateway (HNB-GW), which is typically installed within an operator's network may aggregate traffic from a large number of HNBs back to a core network.

Figure 2:
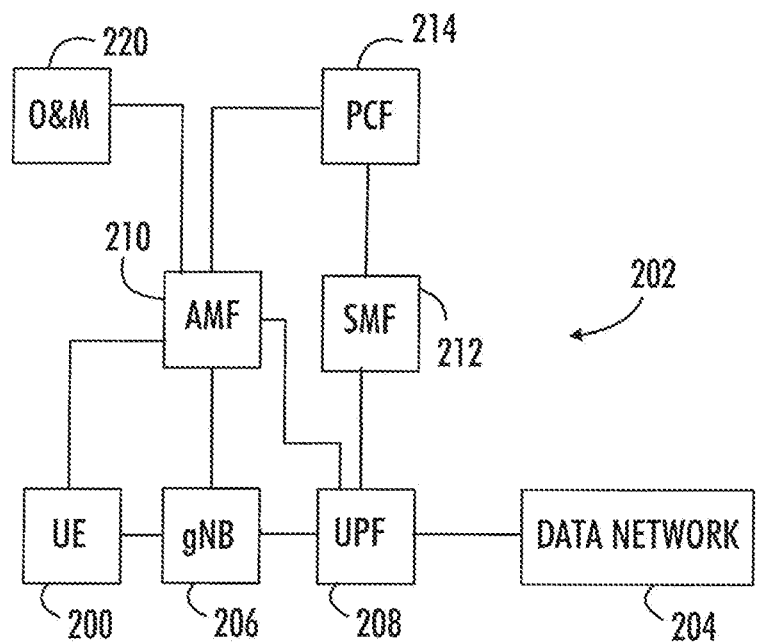

FIG. 2 illustrates an example of a communication system based on 5G network components. A user terminal or user equipment 200 communicating via a 5G network 202 with a data network 204. The user equipment 200 is connected to a base station or gNB 206 which provides the user equipment a connection to data network 204 via one or more User Plane Functions 208. The user equipment 200 is further connected to Core Access and Mobility Management Function, AMF 210, which is a control plane core connector for (radio) access network and can be seen from this perspective as the 5G version of Mobility Management Entity, MME, in LTE. The 5G network further comprises Session Management Function, SMF 212, which is responsible for subscriber sessions, such as session establishment, modify and release and a Policy Control Function 214 which is configured to govern network behavior by providing policy rules to control plane functions. The network further comprises operations and maintenance unit (O&M) 220 of the operator of the network.

In order to operate, wireless communications synchronous systems need common time reference. Otherwise communication over the radio interface may fail as network elements transmit/receive in erroneous times. This requirement for stabile and accurate time source requires provision of Precision Reference Clock, PRC, such as GNSS time or atomic clocks. This may be costly for network operators, and also creates the risk of single point of failure, which may be related to availability of PRC service. Thus, there is a need for monitoring accuracy of provided Network Time over radio interface even in standalone mode operations for radio access nodes such as eNBs, when PRC was lost. A possibility to correct erroneous timing would be valuable.

Figure 3:
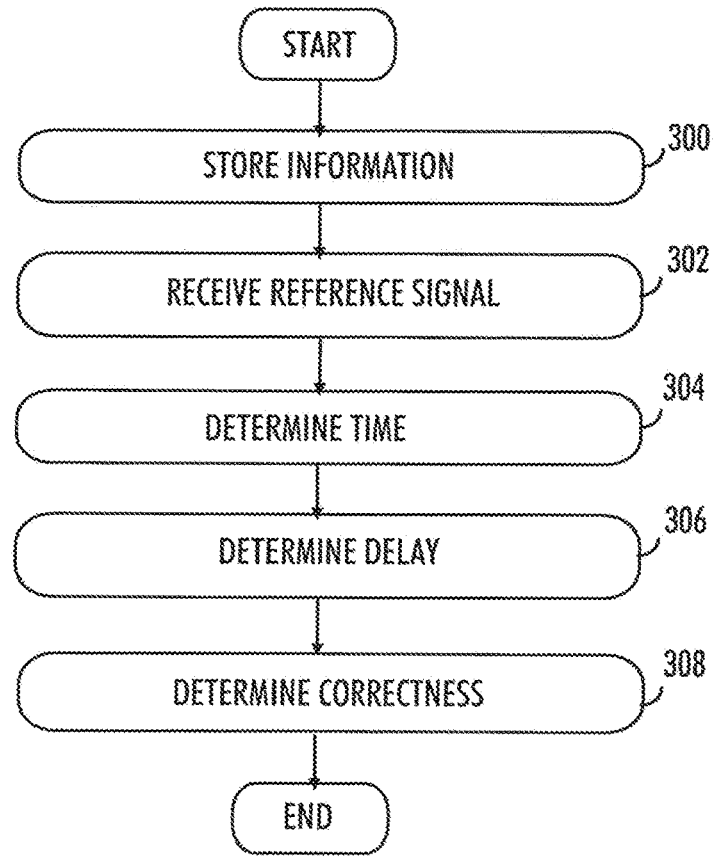
FIGS. 3 and 4 are flowcharts illustrating some embodiments.

FIG. 3 is a flowchart illustrating an embodiment. The flowchart illustrates an example of the operation of the apparatus or network element acting as a user equipment or a part of a user equipment.

In step 300, the apparatus is configured to store information on a reference propagation delay between the apparatus and one or more radio access nodes.

In step 302, the apparatus is configured to control reception of a reference signal from one or more radio access nodes, the reference signal comprising information on the transmission time instant of the signal.

In step 304, the apparatus is configured to determine the reception time instant of the reference signal.

In step 306, the apparatus is configured to determine the propagation delay of the reference signal based on the time difference of the reception time instant and the transmission time instant.

In step 308, the apparatus is configured to determine correctness of time references of the apparatus and the one or more radio access nodes based on the determined and stored propagation delays.

In an embodiment, if the determined and stored propagation delays related to more than one radio access nodes are unequal, the apparatus may be configured to determine that the time reference of the apparatus is incorrect.

In an embodiment, if the determined and stored propagation delay related to a first radio access node is unequal and the determined and stored propagation delay related to a second radio access nodes is equal with a given margin, the apparatus may be configured to determine that the time reference of the first radio access node is incorrect.

In an embodiment, determine correction for the incorrect time reference.

In an embodiment, the apparatus may be configured to control transmission of an indication to the first radio access node, the indication comprising information on the correction for the incorrect time reference.

In an embodiment, the apparatus may be configured to correct the time reference of the apparatus based on the determined correction.

Figure 4:
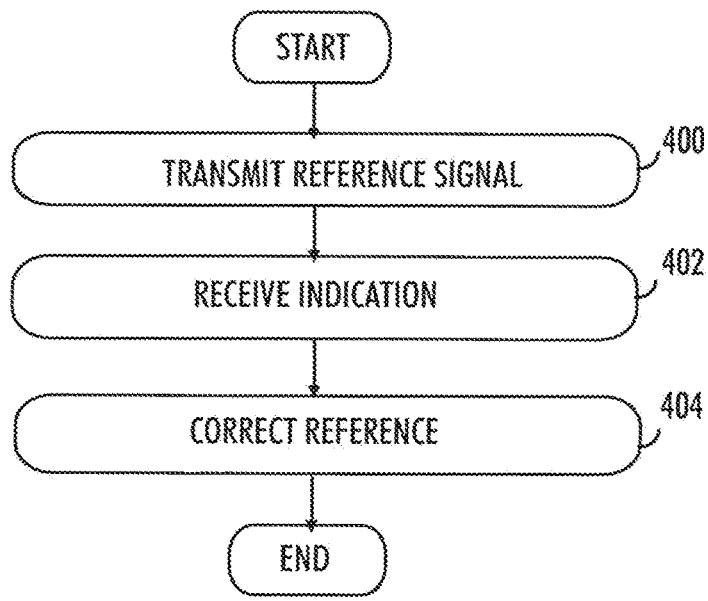

FIG. 4 is a flowchart illustrating an embodiment. The flowchart illustrates an example of the operation of the apparatus or network element acting as a radio access node or a part of a radio access node.

In step 400, the apparatus is configured to control transmission of a reference signal to a user equipment, the reference signal comprising information on the transmission time instant of the signal.

In step 402, the apparatus is configured to control reception of an indication from the user equipment, the indication comprising information on the correction for the time reference of the apparatus.

In step 404, the apparatus is configured to correct the time reference of the apparatus based on the indication.

In an embodiment, a user equipment may be utilised to monitor the timing of radio access nodes and timing of the user equipment itself. The method described above thus assures that time alignment within the network monitored by user equipment is stable, even if radio access nodes operated in a standalone mode, without PRC for unlimited time.

Figures 5A, 5B:
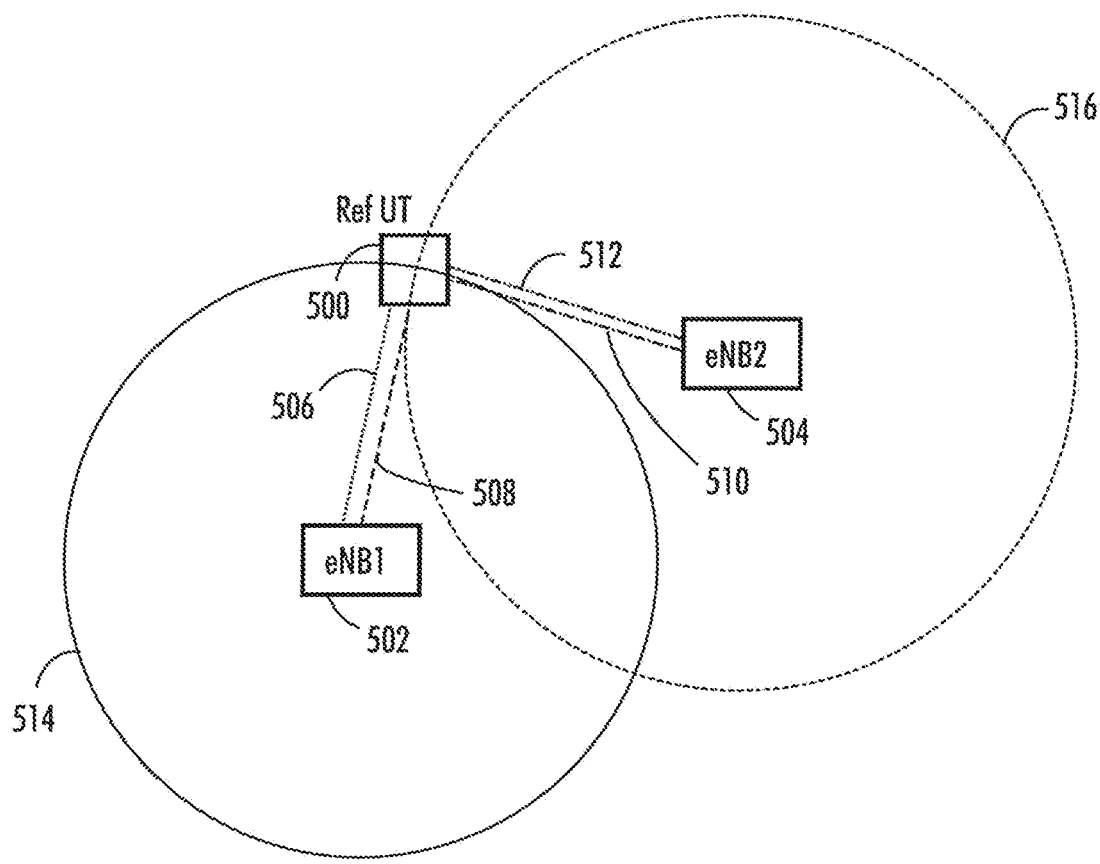

FIGS. 5A and 5B illustrate an example. The figure shows a user equipment 500. The user equipment 500, which may be denoted as Reference User Terminal, Ref UT, or Reference User Equipment, Ref UE, may be an Internet of Things, Iot device or wideband UE. It may be in the coverage area of a number of cells from different radio access nodes, for example eNBs. In the example of FIG. 5A, the Ref UE 500 is shown to be in the coverage area of two access nodes 502, 504, for simplicity. In an embodiment, the Ref UE may be stationery, for example mounted on a mast or any other suitable facility. In an embodiment, the location of the Ref UE may enable line of sight visibility to radio access nodes within the coverage of Ref UE.

It may be possible to measure a line of sight distance between Ref UE and eNBs within the coverage and then convert this distance to time equivalent as microwaves utilises on the radio interface travel at speed of light.

In an embodiment, radio access nodes may be configured to transmit or broadcast a Reference Signal, which comprises information about the physical signal transmission time $T_0$. The time $T_0$ uses as a time reference the internal clock of the access node. Let us assume here that eNB1 502 transmitted the reference signal. The transmission time may be denoted as $T_0(e1)$. The reference signal may be any selected frame, subframe or symbol.

Reference signal transmitted by a radio access node may be received by the Ref UE at time $T_1$. Time $T_1$ uses as a reference the internal clock of the Ref UE. The reception time may be denoted as $T_1(ue)$.

Thus, a Time Of Arrival, TOA, time difference $T_1-T_0$ may correspond to signal propagation delay but two different reference time sources are used—access node and Ref UE. As synchronous transmission is used, time relation between many measurements may be compared. Using above notation, the time difference of reference signal transmitted by eNB1 502 may be denoted as $T_{prop}(eNB1, T_{e1}, T_{ue})$.

As mentioned above, the Ref UE may be configured to store information on a reference propagation delay between the apparatus and one or more radio access nodes. The reference propagation delay 506 between user equipment 500 and access node eNB1 502 may be denoted as $T_{ref}(eNB1)$ and reference propagation delay 510 between user equipment 500 and access node eNB2 504 may be denoted as $T_{ref}(eNB2)$.

The determined TOA propagation delay between Ref UE and an access node may be compared with reference propagation delay for the same access node. Any deviation in TOA measurement may indicate that time reference source at the access node or Ref UE side drifted in time. By analysing TOA measurements to other access nodes, the Ref UE may determine whether reference clock drift is present at the access node or Ref UE side.

In an embodiment, Ref UE may propose a time compensation to access node or Ref UE accordingly. The Ref UE may determine the source of time drift and may provide time correction to eNB or to Ref UE internal reference clock. This way a bottom-up time synchronization may be provided, which differ with respect to legacy top-down approach for time synchronization.

In the example of FIGS. 5A and 5B, the reference propagation delay 506 between user equipment 500 and access node eNB1 502 $T_{ref}(eNB1)$ and reference propagation delay 510 between user equipment 500 and access node eNB2 504 $T_{ref}(eNB2)$ have been determined at some earlier point of time.

For example, the distance between the user equipment Ref UE and access node eNB1 502 and access node eNB2 504 may be measured, for example utilising a laser range finder with the accuracy of millimetres. The propagation time is proportional to the distance. For example, for access node eNB1, following applies:

$$T_{ref}(eNB1) = \frac{D_{ref}(eNB1)}{c}, \quad \text{(Eq. 1)}$$

where $T_{ref}(eNB1)$ is reference signal propagation delay to eNB1 based on distance measurement, c is the speed of light and $D_{ref}(eNB1)$ is measured reference distance between Ref UE and eNB1.

The access node eNB1 502 transmits a reference signal 508 to the user equipment 500 at a time $T_0$ and the user equipment receives the signal at a time $T_1$. Respectively, the access node eNB2 504 transmits a reference signal 512 to the user equipment 500 at a time $T_3$ and the user equipment receives the signal at a time $T_4$.

Using the above method, it is possible to determine corresponding TOA rings, with radius 514, 516, proportional to TOA propagation delay. The equation to determine reference signal propagation delay, using eNB1 as an example, is as follows:

$$T_{prop}(eNB1, T_{e1}, T_{ue}) = T_1(T_{ue}) - T_0(T_{e1}), \quad \text{(Eq. 2)}$$

where $T_{prop}(eNB1, T_{e1}, T_{ue})$ is the reference signal propagation delay, which is a function of distance between Ref UE and eNB1, and reference clocks of eNB1 and Ref UE, $T_1(T_{ue})$ is time of physical reference signal reception by Ref UE, which depends on Ref UE clock and $T_0(T_{e1})$ is time of physical reference signal transmission by eNB1, which depends on eNB1 clock.

In the example of FIG. 5A, the reference clocks of Ref UE, eNB1 and eNB2 are in correct time. Thus, following conditions of equations 3 and 4 are met (using again eNB1 as an example):

$$T_{prop}(eNB1, T_{e1}, T_{ue}) = T_{ref}(eNB1), \quad \text{(Eq. 3)}$$

$$T_1(T_{ue}) - T_0(T_{e1}) = \frac{D_{ref}(eNB1)}{c}, \quad \text{(Eq. 4)}$$

If the above equations match, then there is no error in the reference clocks. It may be that the both the access point eNB and Ref UE are synchronized with precise reference clock PRC, which may be defined as a function $T_{ue}(T_{e1}(T))$, what is a typical situation for mobile network operations. Typically, the access point provides synchronisation for the user equipment. Thus, in a normal situation the reference time in user equipment is a function of the reference time of the user equipment, which in turn is a function of the reference time of the access point.

Based on equations 3 and 4, it may be possible to determine whether reference times $T_{ue}$ or $T_{e1}$ are correct as relative TOA propagation delay needs to be substantially equal reference delay determined by accurate distance measurement equipment. If equations 3 and 4 are fulfilled, the time references of access point and Ref UE are in order. If the equations do not match, there is an error in either the reference time of access point of the Ref UE.

Further, if one of the equations does not match, by analysing equations Eq. 3 and Eq. 4 for more than one access point, it may be possible to determine whether instability of reference time source is related to an access point of for whether there is a common point of failure—Ref UE. If there is an error regarding one access point but other access point equations match, the respective access point may have erroneous timing in its reference clock. If more than one access point equations indicate error, the faulty timing is in the Ref UE.

In an embodiment, a given error tolerance may be applied when determining the correctness of equations 3 and 4.

FIGS. 5A and 5B illustrate a situation where propagation delays of reference signal transmissions of both eNB1 and eNB2 are substantially equal to the respective reference signal propagation delays. FIGS. 6A and 6B in turn illustrate an example, where the access point eNB1 502 lost synchronization with PRC for a period of time. It means that eNB1 needs to rely on own internal clock to maintain clock synchronization. In this case, time relation may be denoted as $T_{ue}(T_{e1}(T_{e1}))$. In the example of FIGS. 6A and 6B this lack of PRC has led to instability of the clock of the eNB1.

FIGS. 6A and 6B illustrate an example where TOA propagation delay distance between Ref UE and eNB1 is not substantially equal to the reference delay to eNB1, and conditions defined by equations 3 and 4 are not met. Propagation delay $T_1(T_{ue})-T_0(T_{e1})$ is greater than reference delay $T_{ref}$(eNB1):

$$T_1(T_{ue})-T_0(T_{e1}) > T_{ref}(\text{eNB1}).$$

As neither eNB1 and Ref UE position is not changed, the reason for TOA error may be reference time source drift at either eNB1 or Ref UE. This is the option as speed of microwave is constant. At this moment, based on one TOA measurement to one eNB, it may not be possible to determine whether problem lies in Ref UE reference time source, $T_{ue}$, or in eNB1 reference time source, $T_{e1}$.

Ref UE may unambiguously indicate the source of time drift by analysing further pairs of eNBs-Ref UE and associated TOA measurements. In the example of FIGS. 6A and 6B, TOA measurement to eNB2 fulfils conditions in equations 3 and 4:

$$T_4(T_{ue})-T_3(T_{e2})=T_{ref}(\text{eNB2}).$$

This indicates that Ref UE reference time source $T_{ue}$, and eNB2 reference time source $T_{e2}$ have the common reference clock with the given tolerance. As for TOA measurement with eNB1 the same Ref UE clock $T_{ue}$ is used, it can be determined that the problem is associated with eNB1 internal clock $T_{e1}$, as it affects time determined by $T_0(T_{e1})$.

In the example of FIGS. 6A and 6B, the error causes too long propagation delay. Similar scenario may be when particular TOA propagation delay is shorter than corresponding reference delay, i.e. where Propagation delay $T_1(T_{ue})-T_0(T_{e1})$ is shorter than reference delay $T_{ref}$(eNB1).

Figures 7A, 7B:
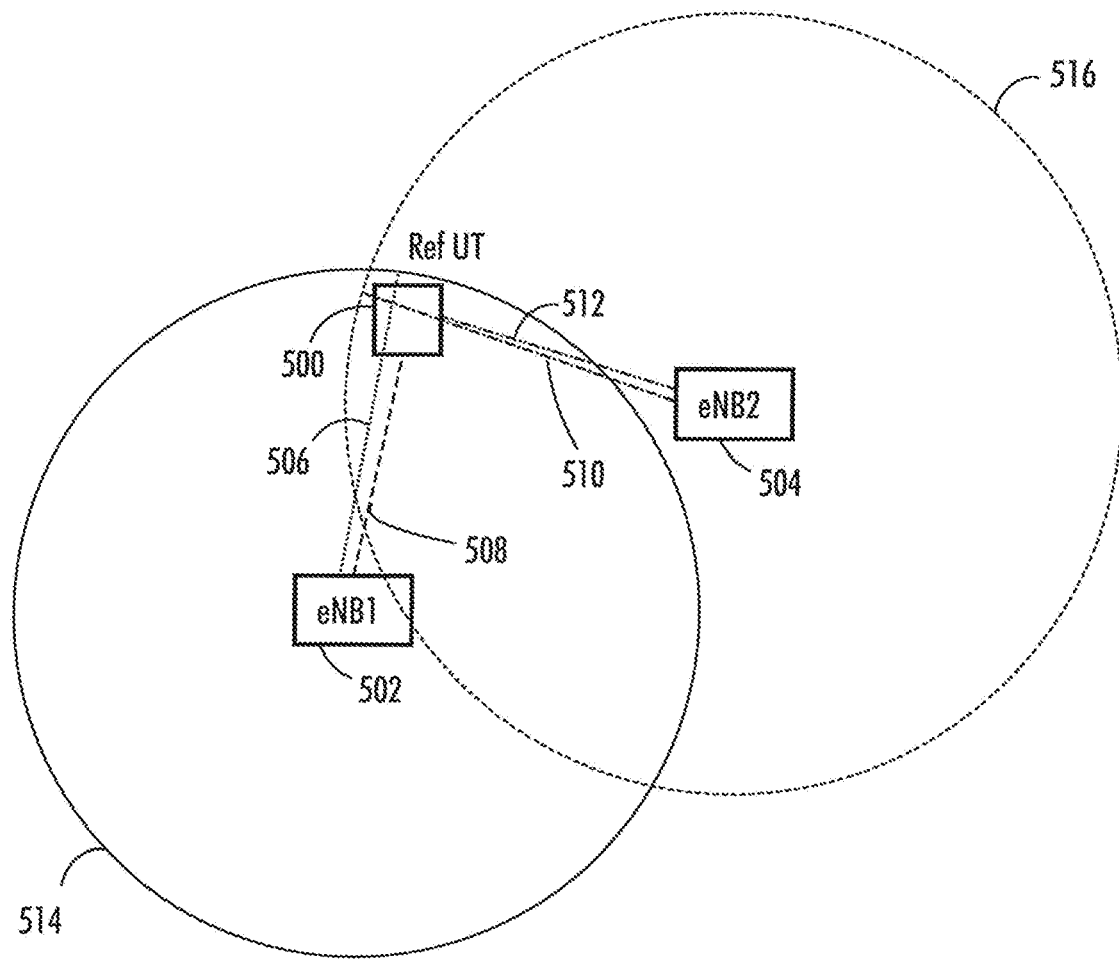

FIGS. 7A and 7B illustrate another example. In this example, neither the reference signal transmitted by eNB1 nor the reference signal transmitted by eNB2 satisfy the equation 3:

$$T_1(T_{ue})-T_0(T_{e1}) > T_{ref}(\text{eNB1}),$$

$$T_4(T_{ue})-T_3(T_{e2}) > T_{ref}(\text{eNB2}).$$

This kind of situation may occur when, due to any reason, the Ref UE 500 has lost synchronization, for example. The wrong reference time at Ref UE may cause incorrect TOA measurements as $T_{ue}$ affects time determined by $T_1(T_{ue})$ and $T_4(T_{ue})$. As $T_{ue}$ is common for TOA measurements, any TOA propagation measurement may be incorrect.

It may be noted currently user equipment needs to periodically synchronize with a radio access node, which procedure requires a Random Access procedure and consumes radio resources.

Similar scenario as in FIGS. 7A and 7B may also be when any TOA propagation delay is shorter than any related reference delay.

It may be noted that a typical time drift is a continuous and gradual process, which with respect to Ref UE sampling period may be enough for time drift modelling. A parameter for allowed time drift, e.g. $T_{drift1Max}$ for eNB1 may be determined in order to specify whether any correction action from Ref UE is needed.

An intersection area for TOA measurements with different current $T_{drift1}$ indications may be used for further assessment of reference time stability and may also trigger optimum corrective action.

In an embodiment, the Ref UE 500 may be calibrated prior usage. In LTE, a basic time unit $T_s$=0.0325 microsecond is used, as it is sampling time of an OFDM symbol. This $T_s$=0.0325 microsecond creates a granularity (accuracy) of 4,875 m in distance, which is poor accuracy with respect to values of $T_{ref}$ which may be determined with an accuracy of nanoseconds.

Figure 8:
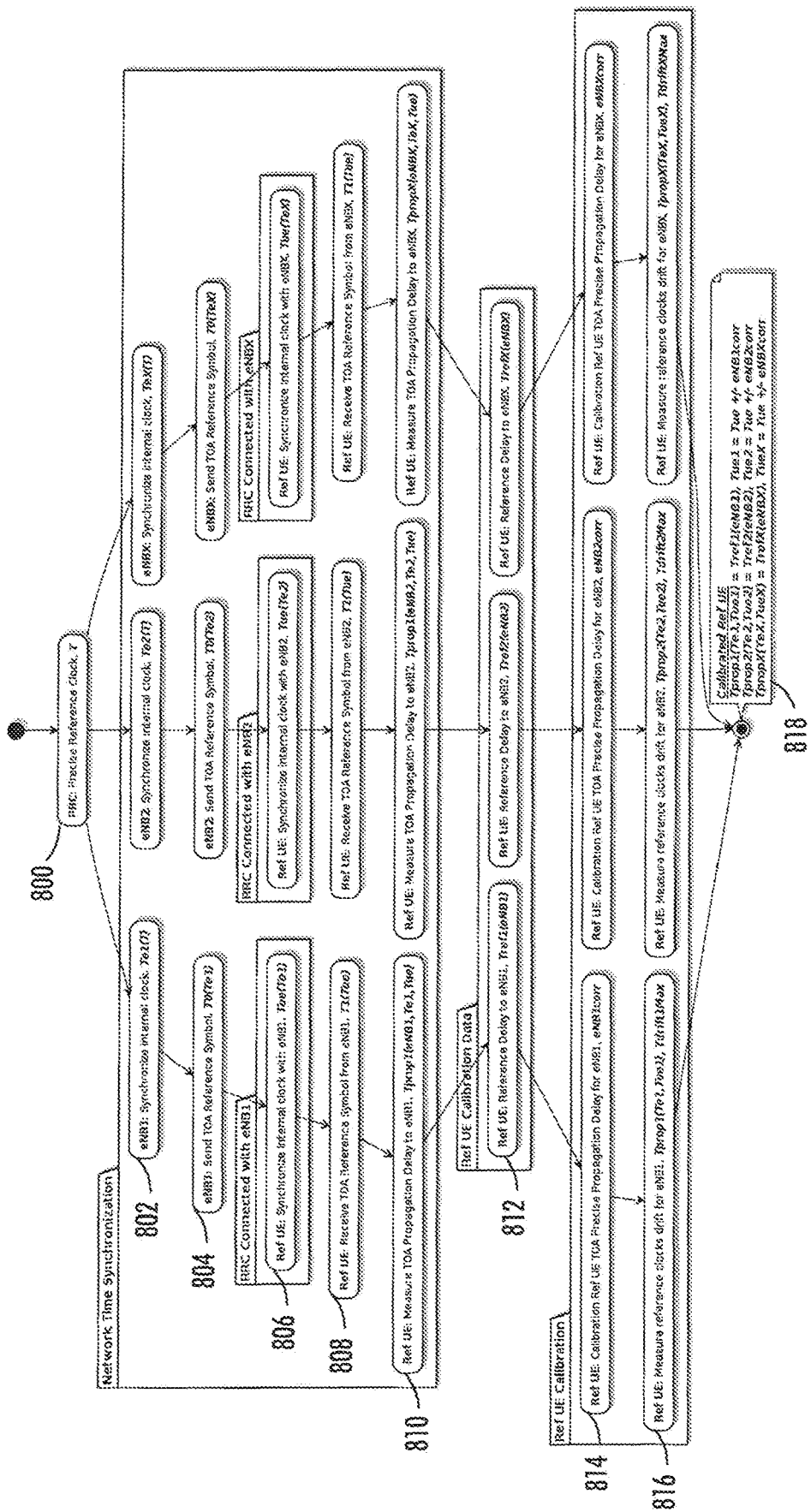
FIG. 8 is a flowchart illustrating an example of user equipment calibration.

FIG. 8 illustrates an example of an activity diagram for a Ref UE calibration process for three eNBs. However, a similar process applies for any number of eNBs.

At the step 800, "PRC: Precise Reference Clock", a time from a precise reference clock T is provided to eNB1, which may be common for eNBs. It may be assumed that this requirement may be fulfilled during calibration.

At the step 802 "eNB1: Synchronize internal clock", the eNB1 internal clock may be synchronized with PRC. Thus, the eNB1 internal clock $T_{e1}$ is a function of T, i.e. $T_{e1}(T)$. If PRC is available for eNBs, the substantially same time is used within entire mobile network:

$$T_{e1}(T)=T_{e2}(T) \quad \text{(Eq. 5)}$$

Without synchronisation with PRC, time $T_{e1}$ needs to rely on stability of its own crystal oscillator (or other means), in which case $T_{e1}$ time value may be expressed as $T_{e1}(T_{e1})$ and relation equation 5 may not be true.

At the step 804, "eNB1: Send TOA Reference Symbol", the eNB1 broadcasts or transmits a reference symbol, which comprise information about the physical reference symbol transmission time. In an embodiment, it may be the transmission time from the eNB1 antenna system. In this case, $T_0(T_{e1})$ may be provided in a form of HH:MM:SS:MS:US:NS and due to latching process, $T_0$ depends on quality of $T_{e1}$. As $T_0(T_{e1})$ represents the physical transmission time, an eNB1 processing and eNB1 specific transmission delay may need to be compensated.

At the next step 806, "Ref UE: Synchronize internal clock with eNB1", the Ref UE may perform a random access procedure in order to receive network time. This way, the Ref UE may synchronize its own internal clock $T_{ue}$ with the connected eNB1, which means initially a function $T_{ue}(T_{e1})$. Any inaccuracies in $T_{e1}$ may affect $T_{ue}$. This step is for calibration. Also, Ref UE time drift may be expected, so after some period synchronisation may be lost:

$$T_{ue}(T_{ue})=T_{ue}(T_{e1}) \quad \text{(Eq. 6)}$$

If PRC is available for Ref UE, Ref UE time may be a function of time T as specified in equation 7, which may be considered as typical case. $T_{ue}$ time drift may be regularly compensated when Ref UE synchronize with the network.

$$T_{ue}(T_{ue})=T_{ue}(T_{e1})=T_{ue}(T_{e1}(T)) \quad \text{(Eq. 7)}$$

At the step 808, "Ref UE: Receive TOA Reference Symbol from eNB1", the Ref UE may receive the reference symbol and latch time of its reception $T_1$ with respect to own time reference source $T_{ue}$, which means it is a function $T_1(T_{ue})$. Ref UE may take into consideration Ref UE processing and transmission delay.

At the step 810, "Ref UE: Measure TOA Propagation Delay to eNB1", the Ref UE measures TOA signal propagation delay to eNB1 using $T_0$ and $T_1$ values. Signal propagation delay $T_{prop1}$(eNB1, $T_{e1}$, $T_{ue}$) is determined by equation 2 but is measured with granularity of basic time unit $T_s$.

In step 812, "Ref UE: Reference Delay (Distance) to eNB1", reference delays for eNBs may be determined as specified by equation 1.

Figure 9:
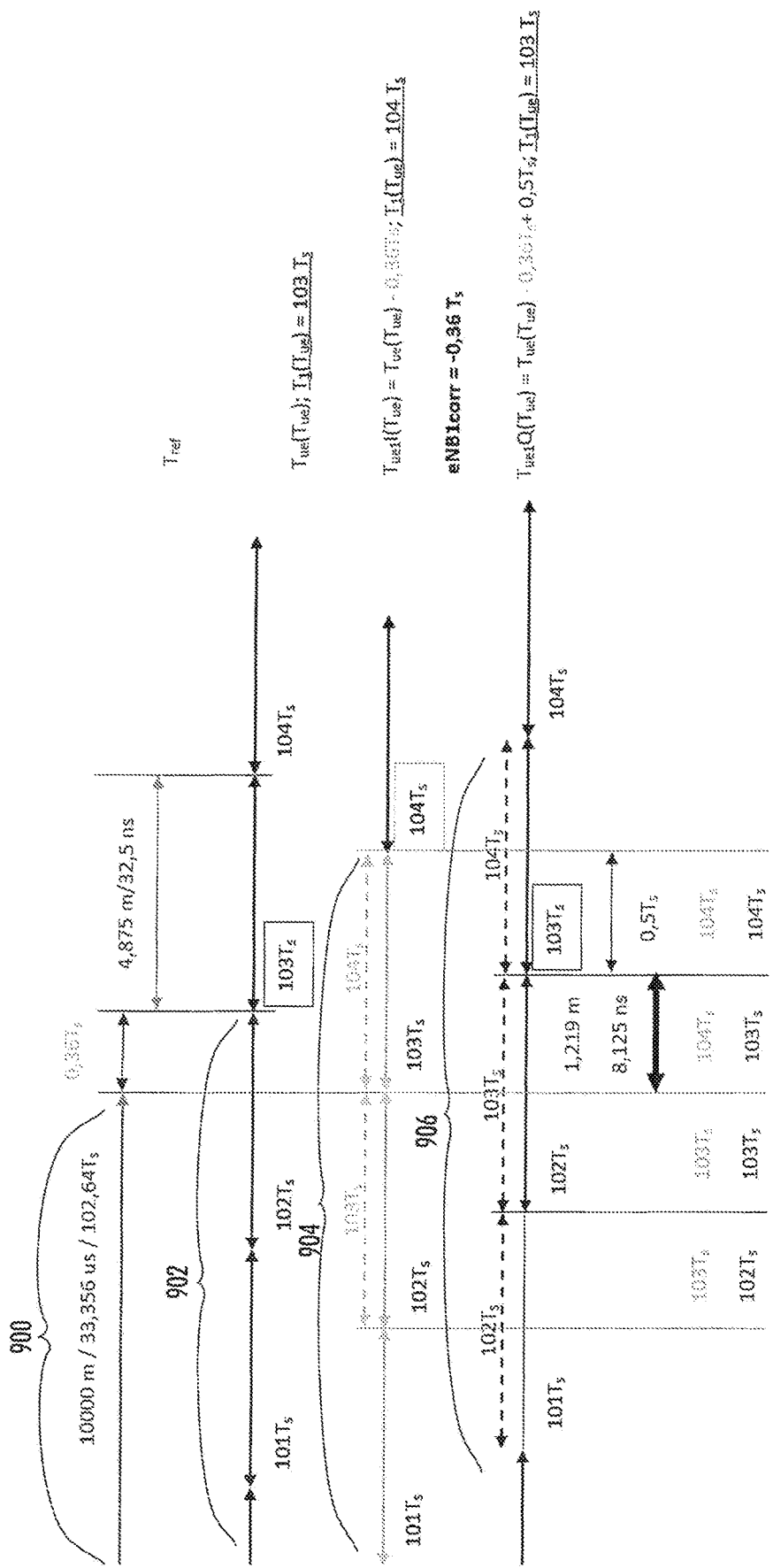
FIG. 9 illustrates a numerical example.

The step 814, "Ref UE: Calibration Ref UE TOA Propagation Delay (Distance) for eNB1" describes a process of fine tuning TOA accuracy improvement. A TOA related correction factor eNB1corr is determined. This correction factor may be added to TOA propagation delay measurements for the given eNB. This may be explained on the following numerical example with exemplary data also illustrated in FIG. 9. The non-limiting numerical values are merely an illustrative example.

Ref UE is in this example fully synchronized with the network time, i.e. $T_{ue}(T_{ue})=T_{ue}(T_{e1})$; this assures that any initial time drift is compensated.

Transmission time of reference signal $T_0(T_{e1})$ is HH:MM:SS:MS:US:NS=00:00:00:00:00:00.

In this example, Ref UE is at a distance $D_{ref1}$(eNB1)= 10000 m from the eNB antenna system 900, which corresponds to 33,356 microseconds for microwave signal propagation and to $T_{ref1}$(eNB1)=102.64 Ts; 00:00:00:00:33:36.

Ref UE may latch information about $T_1(T_{ue})$ with $T_s$ resolution 902, which means $T_1(T_{ue})$=103 $T_s$. There may be an error related to $T_1(T_{ue})$ granularity, which may be equal –0.36 $T_s$, which may be denoted as eNB1corr.

In the next step eNB1corr=–0.36 $T_s$ may be added to $T_{ue}(T_{ue})$ for reference to eNB1, which in this case may be denoted as $T_{ue1}(T_{ue})$:

$$T_{ue1}(T_{ue})=T_{ue}(T_{ue})-\text{eNB1corr} \quad \text{(Eq. 8)}$$

Based on equation 8, any following TOA measurement regarding eNB1 may be compensated by eNB1corr. In the result, $T_s$ boundary is aligned with real propagation delay determined by $T_{ref1}$(eNB1). A slight difference in the accuracy of time reference in $T_1(T_{ue})$ may be then signaled by change of indicated $T_s$, which may be 103 $T_s$ (if on the left side of FIG. 9) or 104 $T_s$ (if on the right of FIG. 9);

Further, additional accuracy of TOA measurement may be achieved by the usage of quadrature time references $T_{ue1}I(T_{ue})$ 904 and $T_{ue1}Q(T_{ue})$ 906, shifted by 0.5 $T_s$; as it may be seen, for $T_{ue1}I(T_{ue})$ reference symbol may be latched at $T_1(T_{ue})$=104 $T_s$, whereas for $T_{ue1}Q(T_{ue})$ at $T_1(T_{ue})$=103 $T_s$;

In the result, $T_1(T_{ue})$ event may be allocated with accuracy of ¼ $T_s$, which may be four times better with respect to regular TOA measurement, for example.

By adding eNB1corr to time reference at Ref UE side, it may be possible to detect any changes in TOA measurements, which means higher TOA precision. In an embodiment, correction eNB1corr is static. Other corrections factors may be determined for any other eNBs.

Moving back to FIG. 8, at the step 816, "Ref UE: Measure reference clock drift for eNB1", Ref UE measures stability of $T_{drift1}(T_{e1}, T_{ue1})$. By usage of $T_{ue1}I(T_{ue})$ and $T_{ue1}Q(T_{ue})$ (or more shifted reference clocks for TOA measurements), TOA accuracy may be enhanced. In this case, it may be detected a time shift of 8,125 ns, which may be sufficient for mobile network time monitoring and verification. This may be also denoted as $T_{drift1Max}$ value, which may be used as a trigger if measured TOA delay exceeds this limit with respect to $T_{ref1}$(eNB1).

In an embodiment, higher TOA precision may be also possible by usage of more $T_s$ shifts as a time reference at Ref UE, which is not technically complicated as $T_1$ latching process needs to be multiplied for shifted reference times such as:

$$T_{ue1}I(T_{ue})=T_{ue1}(T_{ue}), \quad \text{(Eq. 9A)}$$

$$T_{ue1}Q(T_{ue})=T_{ue1}(T_{ue})+½T_s \quad \text{(Eq. 9B)}$$

In an embodiment, once Ref UE is calibrated, any changes in TOA propagation delay may be caused by instabilities related to Ref UE $T_{ue}$ for $T_1(T_{ue})$, or to eNB1 $T_{e1}$ for $T_0(T_{e1})$.

In an embodiment, instabilities at eNB1 $T_{e1}(T_{e1})$ may have impact on TOA measurement related to eNB1.

In an embodiment, instabilities at Ref UE $T_{ue}(T_{ue})$ may have impact on any TOA measurement performed by Ref UE with respect to any other eNB, as time floor $T_{ue}(T_{ue})$ may be common and any added corrections are static, such as equation 8.

In normal mobile network operations where PRC is available, time reference at eNBs are within tolerances, which also means that Ref UE (or any UE) connected to the network may have accurate and precise time. The timing of UEs may be periodically resynchronised to cover any instabilities at UE reference time source. However, if PRC is not available to some eNB, the resynchronisation mechanism may give wrong results.

Finally, in step 818, Ref UE TOA measurements may be calibrated with any eNBs in the coverage. Parameter $T_{drift1Max}$ for eNB1 may determine accuracy and may be used as a trigger, if exceeded, for $T_{ue}$ or $T_{e1}$ time corrections. As explained, higher precision may be achieved if quadrature or similar technique is used, see equations 9A and 9B.

Figure 10:
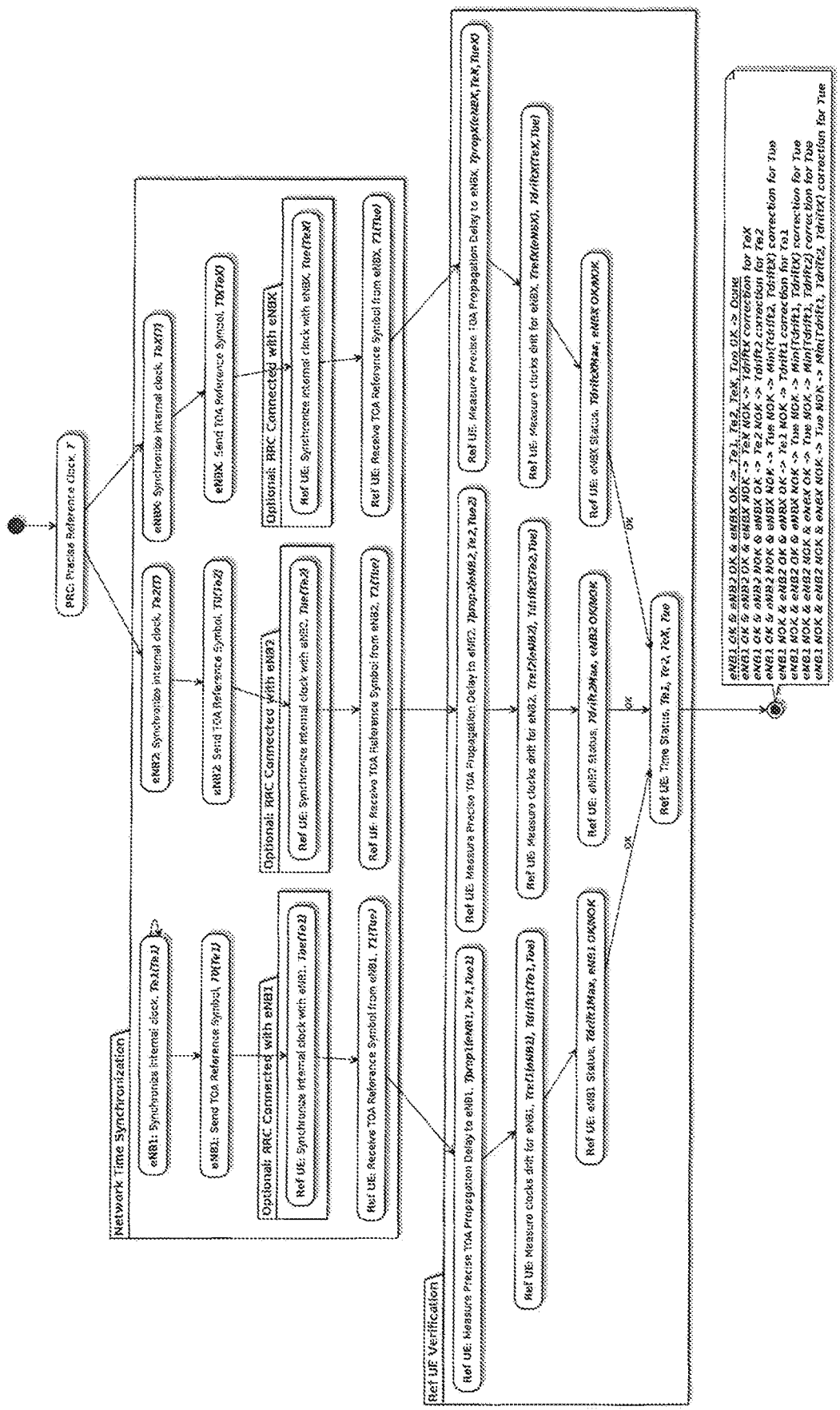
FIG. 10 is a flowchart illustrating an example of operation of a calibrated user equipment.

FIG. 10 illustrates an example of an activity diagram for a calibrated Ref UE 500. In this example, eNB1 may have lost synchronisation with PRC. However, PRC may be still available for eNB2 and eNBX. ENB1 operation is based on its own internal clock. In an embodiment, Ref UE may detect any reference time drift once TOA measurement utilising a reference signal transmitted by eNB1 exceeds the given threshold level, such as $T_{drift1Max}$. It may be that although an access node has lost synchronisation, the internal clock of the node may still keep time accurately enough, at least for a period of time. In the example of FIG. 10, time drift of ENB1 may still be within limits although it lost synchronization with PRC. Ref UE may determine that TOA measurements from eNBs are correct, which means conditions in equation 3 and 4 are true for eNBs. No further action is needed from Ref UE. This state may correspond to scenario shown in FIGS. 5A and 5B.

Figure 11:
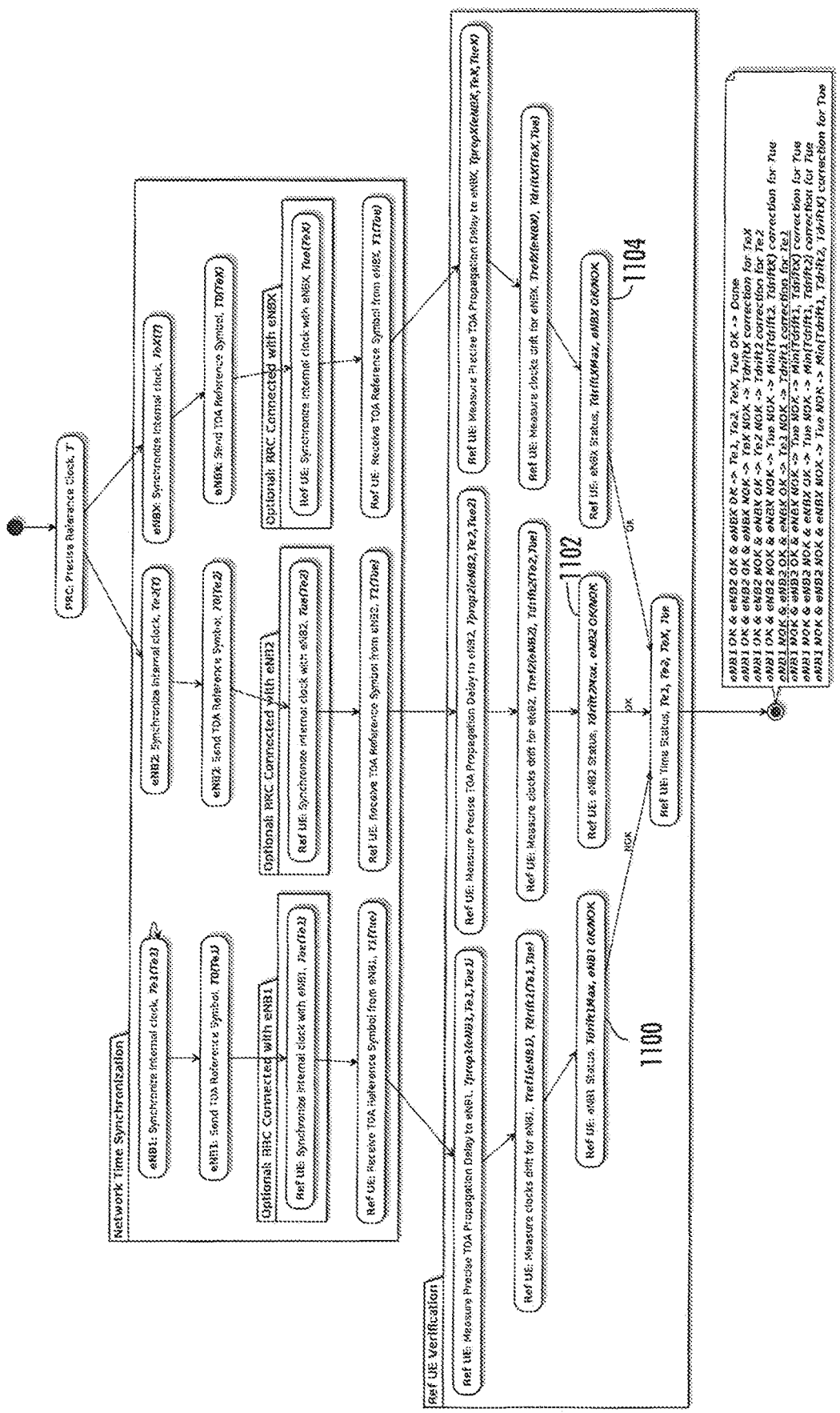
FIGS. 11, 12, 13 and 14 are flowcharts illustrating some examples of some embodiments.

With respect to FIG. 10, after the given period of time, the internal clock of eNB1 may drift beyond TOA defined $T_{drift1Max}$ threshold. In such a case, Ref UE may detect this state as illustrated in FIG. 11 by NOK state from step 1100 for eNB1. This may correspond to scenario shown in FIGS. 6A and 6B.

In order to determine the source of problem, Ref UE may measure TOA propagation delays to other eNBs in the vicinity, which may be eNB2 and eNBX. These additional TOA measurements are in this example correct, as indicated by OK state from steps 1102 and 1104. This confirms to Ref UE that the problem is related to $T_{e1}$ drift of eNB1. The reference time at Ref UE, $T_{ue}$, is correct because $T_{ue}$ is common for eNBs (eNB1corr is a static shift).

In an embodiment, eNB1 $T_{e1}$ time drift may be assessed to be substantially equal to $T_{drift1Max}$, or in general $T_{drift1}$, if better accuracy is needed. A change may be positive or negative, which may be denoted as +/–$T_{drift1}$.

Figure 12:
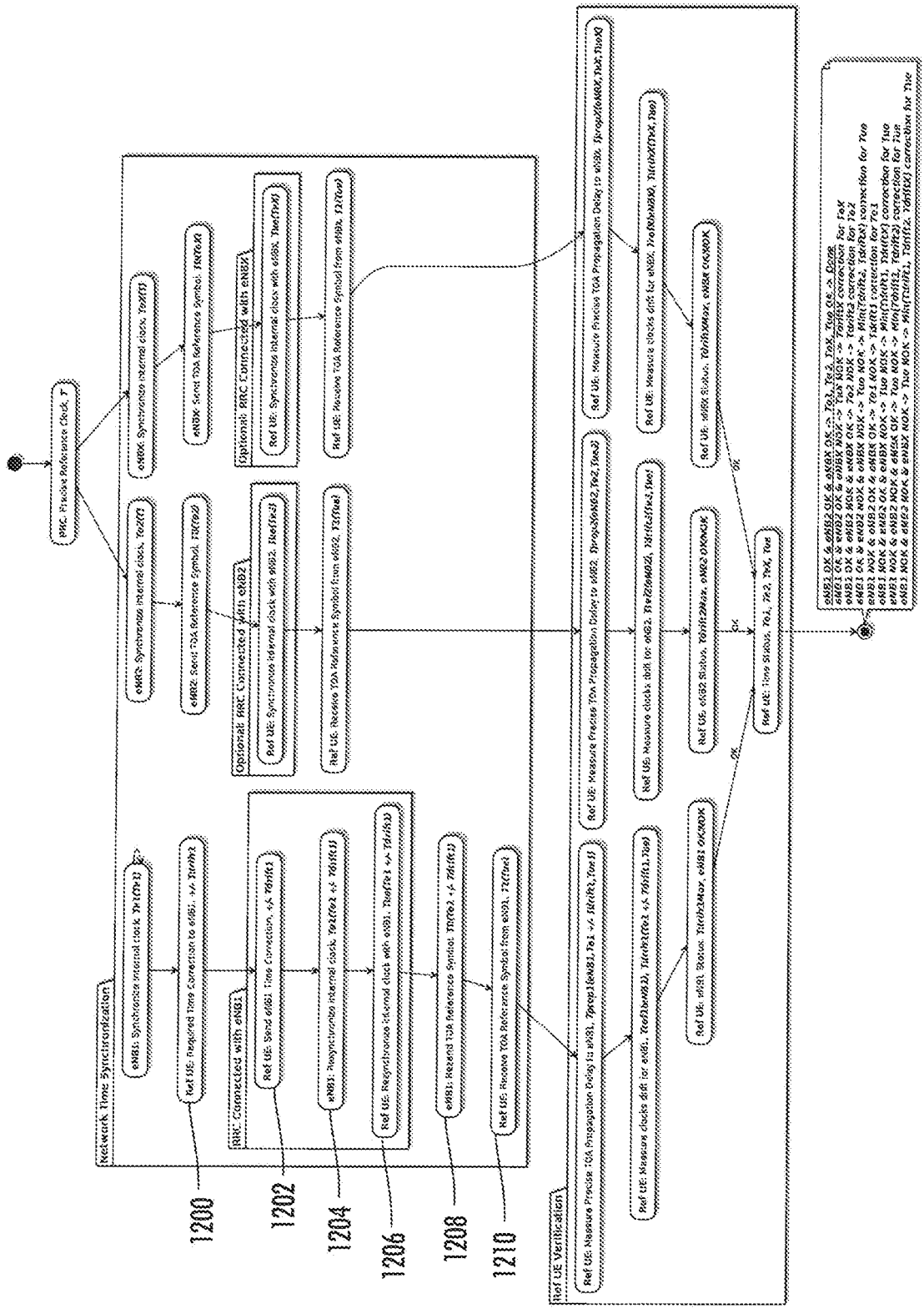

In an embodiment, when Ref UE has determined that the eNB1 internal clock $T_{e1}$ needs to be adjusted, it may perform actions as illustrated on FIG. 12.

In FIG. 12, at the step 1200, "Ref UE: Required Time Correction to eNB1", Ref UE determines that time correction for eNB1 may be needed by $+/-T_{drift1}$, which may be exact value, if precise reference time floor is available as explained earlier, or $T_{drift1Max}$.

Ref UE requests an RRC Connection to eNB1.

Then, at the step 1202, "Ref UE: Send eNB Time Correction", Ref UE may report to eNB1 that eNB1 internal clock needs to be adjusted by $+/-T_{drift1}$, which means that $T_{e1}$ time should be changed to $T_{e1}+/-T_{drift1}$.

At the step 1204, "eNB1: Resynchronize internal clock", eNB1 is configured to adjust the internal clock of eNB1 to $T_{e1}+/-T_{drift1}$. This also affects any UE connected to this eNB. Thus, any other UE will receive corrected time per legacy synchronization mechanism, even if the given eNB operate without connection with PRC.

At the step 1206, "Ref UE: Resynchronize internal clock", Ref UE, which is in RRC Connected state, also adjust its internal clock $T_{ue}(T_{e1}+/-T_{drift1})$, which means both eNB1 and Ref UE will have common reference clock for TOA measurements.

In step 1208, eNB1 sends a reference signal at time instant $T_0$. Ref UE receives signal at step 1210 as time instant $T_1$, as described earlier. These transmissions occur during updated internal clocks of eNB1 and Ref UE. For Ref UE, it means that TOA measurement to eNB1 is correct again.

Ref UE is configured to continuously measure also other TOA measurements to verify whether other measurements are still correct, which confirms that problem was solved by $T_{e1}$ time adjustment. If other TOA measurements are ok, problem is solved, and no further actions are needed. Synchronization is restored.

Figure 13:
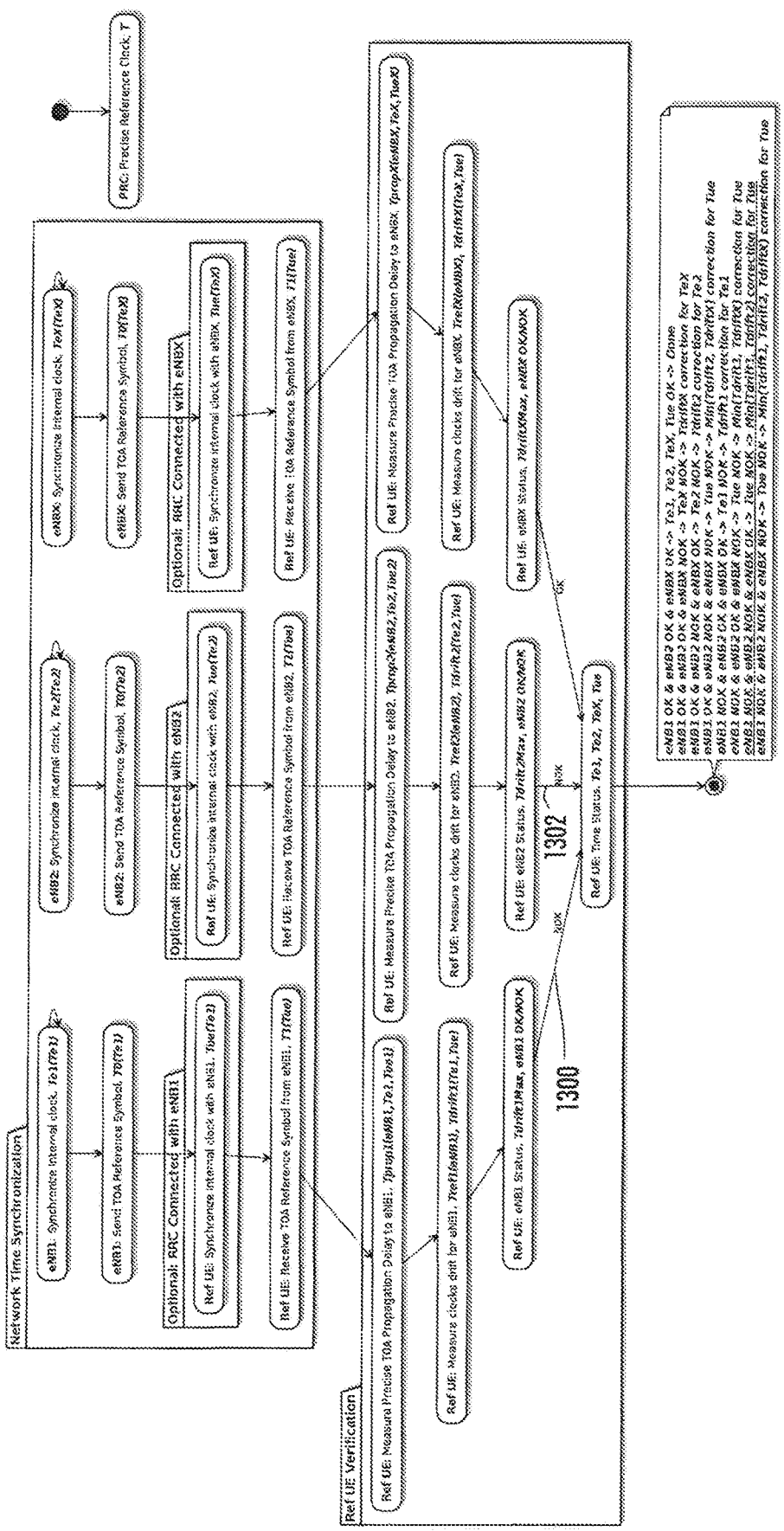

If PRC is not available for larger number of eNBs or not present at all, Ref UE may determine time drift in more than one eNB, as illustrated on FIG. 13, where two NOK states 1300, 1302 may be received. This scenario also applies for instability of Ref UE internal clock, $T_{ue}$. This condition may be signalled by more than one TOA measurement errors, which is different condition if one eNB is affected.

In this case, Ref UE may determine which TOA measurements are incorrect and assess errors by $T_{drift1Max}$ or $T_{drift1}$ values respectively for eNBs. Then, Ref UE may determine time correction for $T_{ue}$, which may be as illustrated by equation 10:

$$\min(T_{drift1}, T_{drift2}), \quad (Eq. 10)$$

where $T_{drift1}$, $T_{drift2}$ are values for different eNBs.

Figure 14:
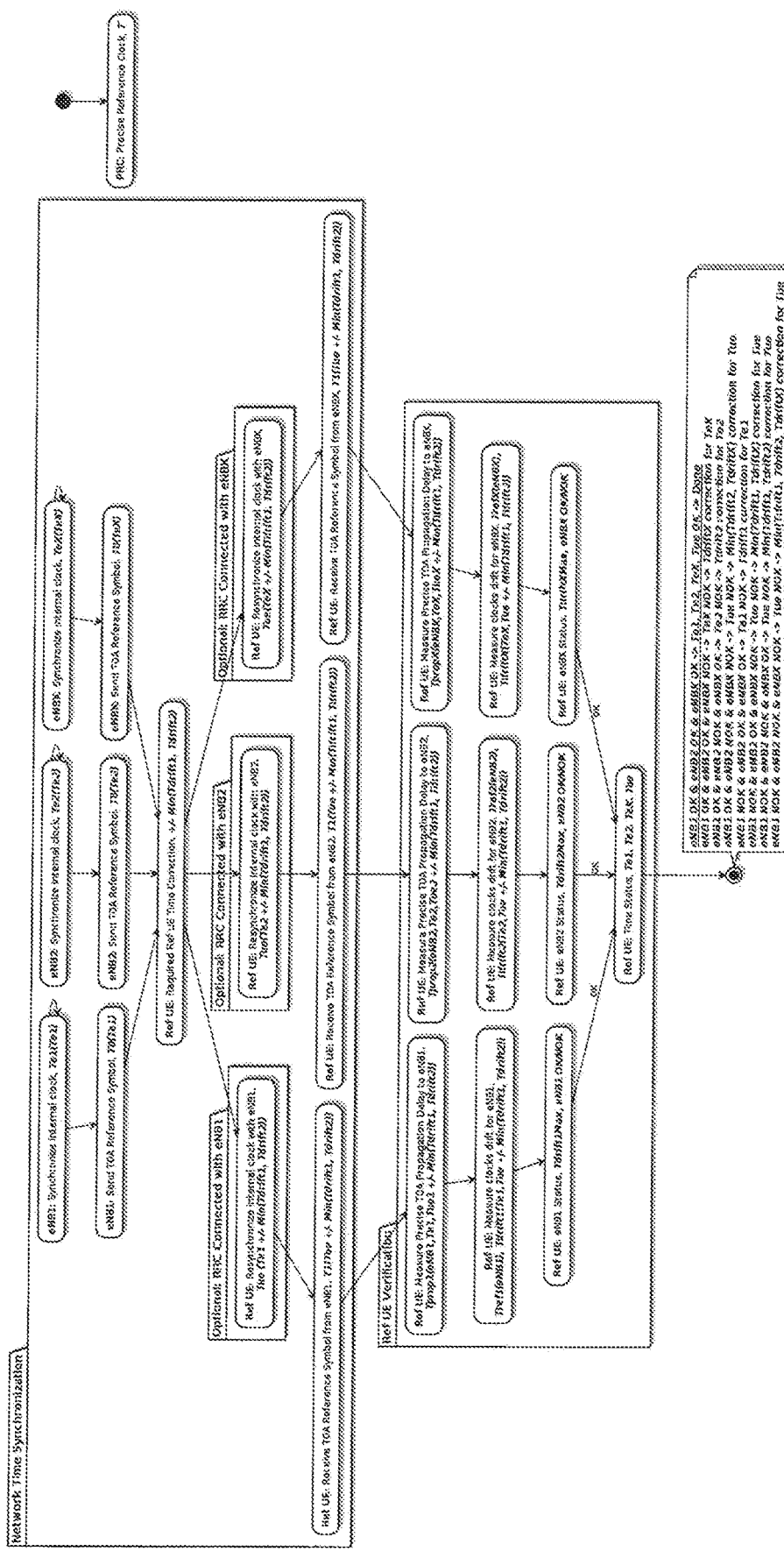

Proposed solution ensures that changes are implemented in smaller increments, which improves management of such changes. It may be noted, that a change in $T_{ue}$ also affects other TOA measurements. FIG. 14 illustrates an example how a change to reference time at Ref UE, (equation 10), may be implemented. Ref UE may stay in RRC Idle state, or if it is already in RRC Connected state, changes may be applied to received time value, so current time value may have no impact on these changes.

After implementation of changes in Ref UE internal clock reference time, Ref UE may be configured to repeat TOA measurements until TOA measurements are similar to these from calibration.

In an embodiment, in more complicated scenarios, corrections may be proposed both to any eNB and to Ref UE until results are correct again.

Thus, as illustrated in the above example, Ref UE may be able to distinguish whether reference time source needs to be corrected at eNB or Ref UE, which is useful if mobile network needs to operate without access to PRC due to any reason. This may be the case when the network utilises satellite-based synchronization and when the performance of the satellite-based synchronization is affected by natural phenomena such as solar flare or is jammed, or such system is not available.

As illustrated, the proposed solution does not require sophisticated and costly equipment with respect to PRC in the form of atomic clock, for example. Ref UE may be IoT/LTE-M or Wideband UE and still its performance may be sufficient for maintaining operation.

Figure 15:
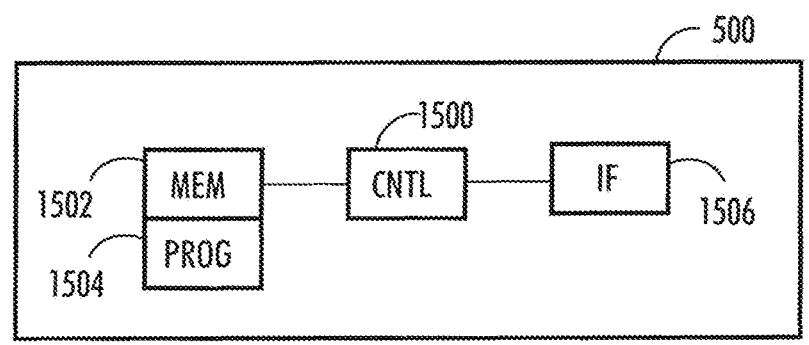
FIGS. 15 and 16 illustrate examples of apparatuses of some embodiments.

FIG. 15 illustrates an embodiment. The figure illustrates a simplified example of an apparatus or network entity applying embodiments of the invention. In some embodiments, the apparatus may be a user equipment such as Ref UE 500 or a part of Ref UE.

It should be understood that the apparatus is depicted herein as an example illustrating some embodiments. It is apparent to a person skilled in the art that the apparatus may also comprise other functions and/or structures and not all described functions and structures are required. Although the apparatus has been depicted as one entity, different modules and memory may be implemented in one or more physical or logical entities.

The apparatus 500 of the example includes a control circuitry 1500 configured to control at least part of the operation of the apparatus.

The apparatus may comprise a memory 1502 for storing data. Furthermore, the memory may store software 1504 executable by the control circuitry 1500. The memory may be integrated in the control circuitry.

The apparatus further comprises one or more interface circuitries 1506 configured to connect the apparatus to other devices and network elements or entities of the radio access network, such as access nodes or eNBs.

In an embodiment, the software 1504 may comprise a computer program comprising program code means adapted to cause the control circuitry 1500 of the apparatus to realise at least some of the embodiments described above.

Figure 16:
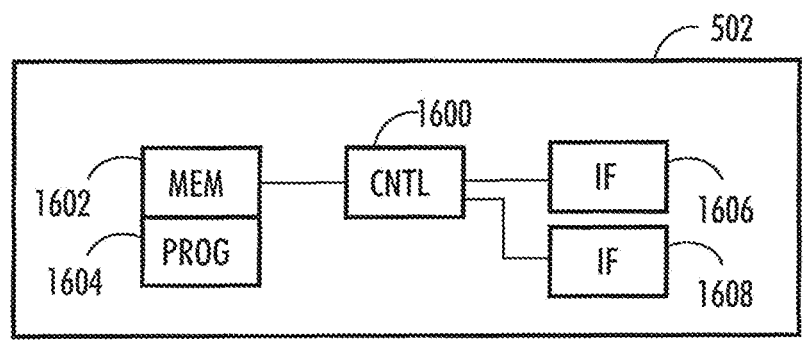

FIG. 16 illustrates an embodiment. The figure illustrates a simplified example of an apparatus or network entity applying embodiments of the invention. In some embodiments, the apparatus may be a network element or network entity acting as a radio access node or eNB 502, or a part of a radio access node or eNB.

It should be understood that the apparatus is depicted herein as an example illustrating some embodiments. It is apparent to a person skilled in the art that the apparatus may also comprise other functions and/or structures and not all described functions and structures are required. Although the apparatus has been depicted as one entity, different modules and memory may be implemented in one or more physical or logical entities.

The apparatus 502 of the example includes a control circuitry 1600 configured to control at least part of the operation of the apparatus.

The apparatus may comprise a memory 1602 for storing data. Furthermore, the memory may store software 1604 executable by the control circuitry 1600. The memory may be integrated in the control circuitry.

The apparatus further comprises one or more interface circuitries 1606, 1608, configured to connect the apparatus to other devices and network elements or entities of the radio access network, such as core network and user terminals. The interfaces may provide wired or wireless connections.

In an embodiment, the software 1604 may comprise a computer program comprising program code means adapted to cause the control circuitry 1600 of the apparatus to realise at least some of the embodiments described above.

The steps and related functions described in the above and attached figures are in no absolute chronological order, and some of the steps may be performed simultaneously or in an order differing from the given one. Other functions can also be executed between the steps or within the steps. Some of the steps can also be left out or replaced with a corresponding step.

The apparatuses or controllers able to perform the above-described steps may be implemented as an electronic digital computer, processing system or a circuitry which may comprise a working memory (random access memory, RAM), a central processing unit (CPU), and a system clock. The CPU may comprise a set of registers, an arithmetic logic unit, and a controller. The processing system, controller or the circuitry is controlled by a sequence of program instructions transferred to the CPU from the RAM. The controller may contain a number of microinstructions for basic operations. The implementation of microinstructions may vary depending on the CPU design. The program instructions may be coded by a programming language, which may be a high-level programming language, such as C, Java, etc., or a low-level programming language, such as a machine language, or an assembler. The electronic digital computer may also have an operating system, which may provide system services to a computer program written with the program instructions.

As used in this application, the term 'circuitry' refers to all of the following: (a) hardware-only circuit implementations, such as implementations in only analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present.

This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

An embodiment provides a computer program embodied on a distribution medium, comprising program instructions which, when loaded into an electronic apparatus, are configured to control the apparatus to execute the embodiments described above.

The computer program may be in source code form, object code form, or in some intermediate form, and it may be stored in some sort of carrier, which may be any entity or device capable of carrying the program. Such carriers include a record medium, computer memory, read-only memory, and a software distribution package, for example. Depending on the processing power needed, the computer program may be executed in a single electronic digital computer or it may be distributed amongst a number of computers.

The apparatus may also be implemented as one or more integrated circuits, such as application-specific integrated circuits ASIC. Other hardware embodiments are also feasible, such as a circuit built of separate logic components. A hybrid of these different implementations is also feasible. When selecting the method of implementation, a person skilled in the art will consider the requirements set for the size and power consumption of the apparatus, the necessary processing capacity, production costs, and production volumes, for example.

In an embodiment, an apparatus comprises at least one processor; and at least one memory including computer program code, the at least one memory and the computer program code configured to, with the at least one processor, cause the apparatus at least to perform: store information on a reference propagation delay between the apparatus and one or more radio access nodes; control reception of a reference signal from one or more radio access nodes, the reference signal comprising information on the transmission time instant of the signal; determine the reception time instant of the reference signal; determine the propagation delay of the reference signal based on the time difference of the reception time instant and the transmission time instant; determine correctness of time references of the apparatus and the one or more radio access nodes based on the determined and stored propagation delays.

In an embodiment, an apparatus comprises at least one processor; and at least one memory including computer program code, the at least one memory and the computer program code configured to, with the at least one processor, cause the apparatus at least to perform: control transmission of a reference signal to user equipment, the reference signal comprising information on the transmission time instant of the signal; control reception of an indication from the user equipment, the indication comprising information on the correction for the time reference of the apparatus; and correct the time reference of the apparatus based on the indication.

In an embodiment, a non-transitory computer readable medium comprises program instructions for causing an apparatus to perform at least the following: storing information on a reference propagation delay between the apparatus and one or more radio access nodes; controlling reception of a reference signal from one or more radio access nodes, the reference signal comprising information on the transmission time instant of the signal; determining the reception time instant of the reference signal; determining the propagation delay of the reference signal based on the time difference of the reception time instant and the transmission time instant; and determining correctness of time references of the apparatus and the one or more radio access nodes based on the determined and stored propagation delays.

In an embodiment, a non-transitory computer readable medium comprises program instructions for causing an apparatus to perform at least the following: controlling transmission of a reference signal to a user terminal, the reference signal comprising information on the transmission time instant of the signal; controlling reception of an indication from the user equipment, the indication comprising information on the correction for the time reference of the apparatus; and correcting the time reference of the apparatus based on the indication.

It will be obvious to a person skilled in the art that, as the technology advances, the inventive concept can be implemented in various ways. The invention and its embodiments are not limited to the examples described above but may vary within the scope of the claims.

The invention claimed is:

1. A user equipment apparatus comprising:
at least one processor; and
at least one memory including computer program code, the at least one memory and the computer program code configured to, with the at least one processor, cause the user equipment apparatus at least to perform:
storing information on a reference propagation delay between the apparatus and one or more radio access nodes;
controlling reception of a reference signal from one or more radio access nodes operated in stand-alone mode without precision reference clock, the reference signal comprising information on a transmission time instant of the reference signal;
determining a reception time instant of the reference signal;
determining a propagation delay of the reference signal based on a time difference of the reception time instant and the transmission time instant; and
determining correctness of time references of the apparatus and the one or more radio access nodes based on the determined and stored propagation delays;
determining that the time reference of the apparatus is incorrect, if the determined and stored propagation delays related to more than one radio access nodes are unequal;
controlling transmission of an indication to the-one radio access node of the one or more radio access nodes, the indication comprising information on a correction for the incorrect time reference based on the determination that the time reference is incorrect;
determining that the time reference of one of the one or more radio access nodes is incorrect, if the determined and stored propagation delay related to the radio access node is unequal and the determined and stored propagation delay related to at least one other node of the one or more radio access nodes is equal with a given margin;
determining correction for the incorrect time reference of one of the one or more radio access nodes; and
correcting the time reference of the apparatus based on the determined correction.

2. A method, comprising:
storing information on a reference propagation delay between an apparatus and one or more radio access nodes;
controlling reception of a reference signal from one or more radio access nodes operated in stand-alone mode without precision reference clock, the reference signal comprising information on a transmission time instant of the signal;
determining a reception time instant of the reference signal;
determining a propagation delay of the reference signal based on a time difference of the reception time instant and the transmission time instant;
determining correctness of time references of the apparatus and the one or more radio access nodes based on the determined and stored propagation delays;
determining that the time reference of the apparatus is incorrect, if the determined and stored propagation delays related to more than one radio access nodes are unequal;
controlling transmission of an indication to the-one radio access node of the one or more radio access nodes, the indication comprising information on a correction for the incorrect time reference based on the determination that the time reference is incorrect;
determining that the time reference of one of the one or more radio access nodes is incorrect, if the determined and stored propagation delay related to the radio access node is unequal and the determined and stored propagation delay related to at least one other node of the one or more radio access nodes is equal with a given margin;
determining correction for the incorrect time reference of one of the one or more radio access nodes; and
correcting the time reference of the apparatus based on the determined correction.

\* \* \* \* \*